(12) United States Patent
Schroeder

(10) Patent No.: US 10,696,498 B2
(45) Date of Patent: Jun. 30, 2020

(54) CRATE-STACKING SYSTEM AND CRATE-STACKING APPARATUS

(71) Applicant: Wincor Nixdorf International GmbH, Paderborn (DE)

(72) Inventor: Berthold Schroeder, Ilmenau (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 0 days.

(21) Appl. No.: 15/596,578

(22) Filed: May 16, 2017

(65) Prior Publication Data

US 2017/0334667 A1    Nov. 23, 2017

(30) Foreign Application Priority Data

May 17, 2016   (DE) .................. 10 2016 109 017

(51) Int. Cl.
| | |
|---|---|
| *B65G 57/16* | (2006.01) |
| *B65G 57/30* | (2006.01) |
| *B65G 47/90* | (2006.01) |

(52) U.S. Cl.
CPC .......... *B65G 57/165* (2013.01); *B65G 47/90* (2013.01); *B65G 57/303* (2013.01); *B65G 2814/0305* (2013.01)

(58) Field of Classification Search
CPC .................. B65G 57/165; B65G 47/90; B65G 2814/0305

(Continued)

(56) References Cited

U.S. PATENT DOCUMENTS 2,554,433 A * 5/1951 Warren .................. B65G 47/90
269/267
3,182,856 A * 5/1965 Goltz ................. B65D 21/0213
206/509

(Continued)

FOREIGN PATENT DOCUMENTS

DE   87 05 990 U1   7/1987
DE   42 03 823 A1   8/1993

(Continued)

OTHER PUBLICATIONS

Search Report for Corresponding European Patent No. 17171278.9; 11 pages.

*Primary Examiner* — Lynn E Schwenning
(74) *Attorney, Agent, or Firm* — Black, McCuskey, Souers & Arbaugh, LPA

(57) ABSTRACT

A crate-stacking system having a multiplicity of crates for stacking in a crate-stacking direction and having a crate-stacking apparatus for automatic stacking, wherein the crate-stacking apparatus has: a crate conveying apparatus designed to convey the crates from a crate feed section to a crate stacking section and to convey the stacked crates from the crate stacking section to a crate discharge section, a crate lifting apparatus arranged at the crate stacking section and which, on opposite sides of the conveying path, has gripping elements such that a respective crate can be gripped at mutually opposite sides by virtue of gripping fingers engaging, at the mutually opposite sides, into associated engagement longitudinal recesses, and a control apparatus connected to the crate conveying apparatus and to the crate lifting apparatus and which is designed to control the crate conveying apparatus and crate lifting apparatus in order to stack the crates.

19 Claims, 10 Drawing Sheets

(58) Field of Classification Search
USPC .......................... 414/788.2, 795.6; 206/509
See application file for complete search history.

(56) References Cited

U.S. PATENT DOCUMENTS

| | | | | |
|---|---|---|---|---|
| 3,190,466 | A * | 6/1965 | Hostetler | B65G 57/303 414/788.8 |
| 3,809,279 | A * | 5/1974 | Arjas | B65D 1/243 220/516 |
| 3,866,763 | A | 2/1975 | Alduk | |
| 4,540,325 | A * | 9/1985 | Heisler | B65G 57/302 414/788.9 |
| 5,480,280 | A * | 1/1996 | Bordon | B65G 59/062 221/292 |
| 5,876,180 | A * | 3/1999 | Sims | B65G 59/106 221/210 |
| 5,882,176 | A * | 3/1999 | Marcoux | B65G 57/302 414/795.3 |
| 6,006,577 | A * | 12/1999 | Waldhauser | B21D 22/04 72/348 |
| 8,297,422 | B2 * | 10/2012 | Arnold | F16D 3/66 192/110 B |
| 8,864,437 | B1 * | 10/2014 | Flaming | B31B 3/00 414/788.2 |
| 2005/0220580 | A1 * | 10/2005 | Arnold | B07C 3/008 414/414 |
| 2005/0220600 | A1 * | 10/2005 | Baker | B65G 1/04 414/626 |
| 2007/0253803 | A1 * | 11/2007 | Gerding | B65G 59/063 414/795.2 |
| 2008/0127613 | A1 * | 6/2008 | Ware | B65B 43/265 53/381.1 |
| 2011/0038702 | A1 * | 2/2011 | Torsten | B65G 57/303 414/795.2 |
| 2012/0219397 | A1 * | 8/2012 | Baker | B65G 1/1373 414/796 |
| 2013/0264242 | A1 * | 10/2013 | Wojno | B65D 21/0209 206/499 |
| 2015/0063972 | A1 * | 3/2015 | Girtman | B25J 9/0093 414/796.9 |
| 2015/0226753 | A1 * | 8/2015 | Antoni | G01N 33/82 436/131 |
| 2015/0336754 | A1 * | 11/2015 | Morency | B65G 59/02 414/796.2 |

FOREIGN PATENT DOCUMENTS

| | | |
|---|---|---|
| DE | 20 2012 103138 U1 | 10/2012 |
| DE | 102006038089 A1 | 2/2018 |
| EP | 2 982 624 A1 | 2/2016 |
| GB | 823300 A | 11/1959 |
| JP | H0397431 U | 10/1991 |
| JP | 10338351 A | 12/1998 |
| NL | 290905 A | 6/1965 |
| WO | 2014067530 A2 | 8/2014 |

* cited by examiner

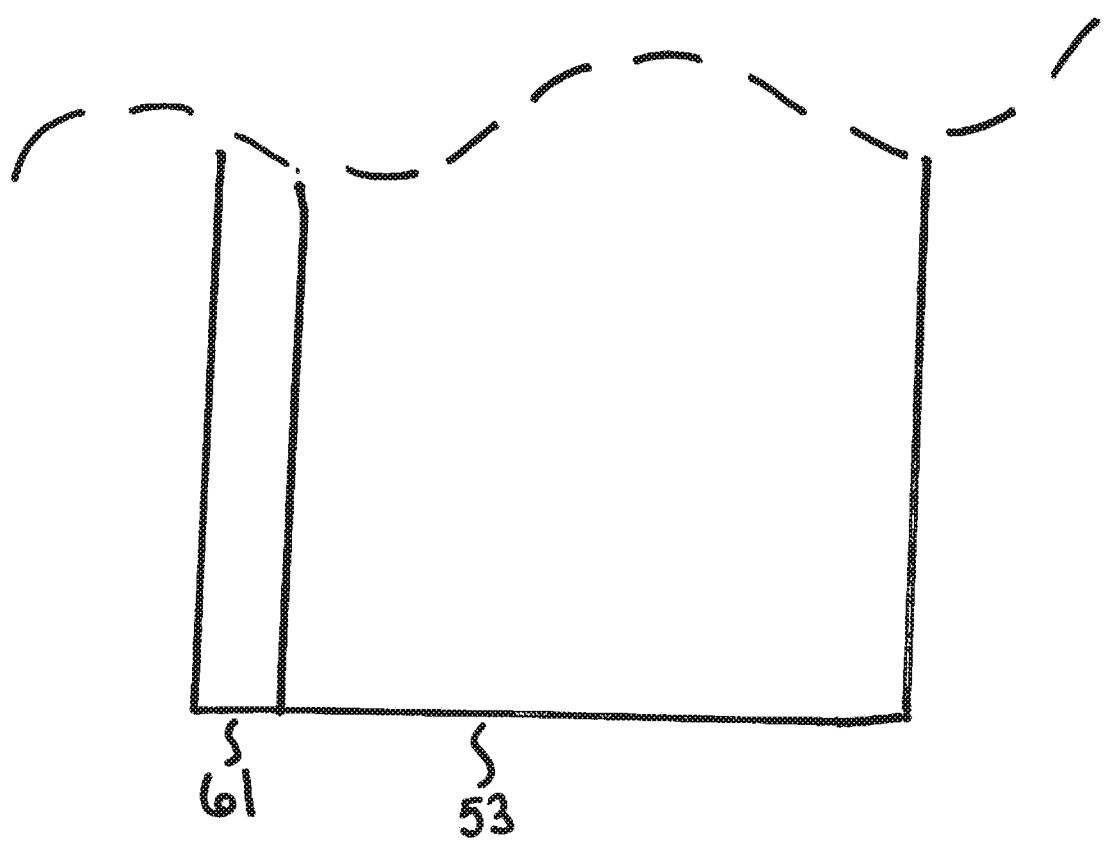

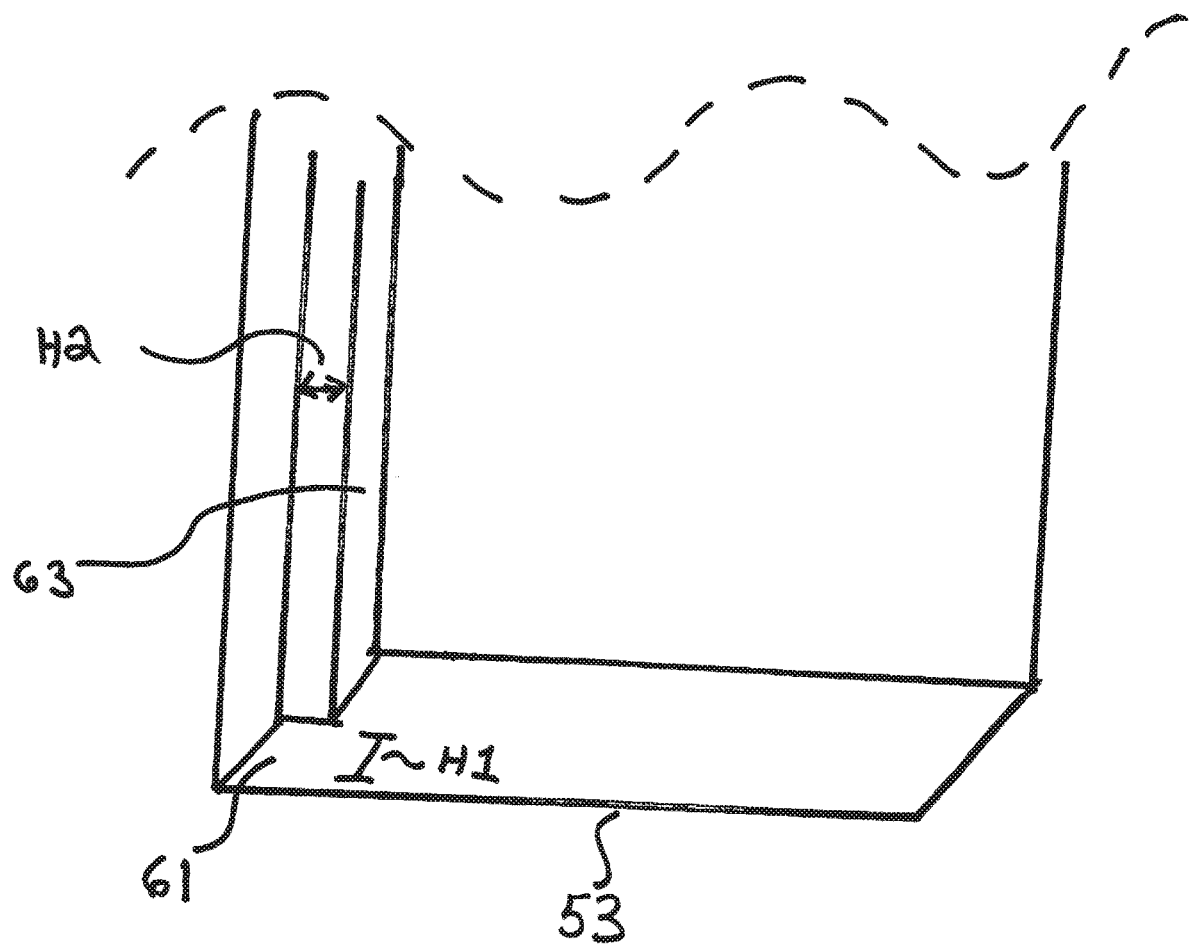

CRATE-STACKING SYSTEM AND CRATE-STACKING APPARATUS

CROSS-REFERENCE TO RELATED APPLICATIONS

This application claims priority to and the benefit of German Patent Application No. DE 10 2016 109 017.4 filed on May 17, 2016, the contents of which are hereby incorporated by reference in their entirety.

BACKGROUND

The claimed system relates to a crate-stacking system for the automatic stacking of crates, and to a crate-stacking apparatus.

Crates, for example beverage crates, are used for transporting full and empty beverage containers, such as for example bottles. A typical transport path of a crate of empties is for example as follows: a consumer returns the crate to a beverage market, and different crate types are collected at the beverage market and are collectively taken back to an empties recycling site by return transport. For the collective return transport of the crates, these are commonly stacked one on top of the other and transported on transport pallets. However, there are a large number of different crates (approximately 2000 types) which have different geometries, such that not all crate types can be stacked together. It has hitherto been the case that the stacking of the crates has been performed manually, that is to say by persons, or stacking apparatuses specific to individual crate types have been used, which commonly stack only a single crate type. However, manual stacking is laborious and time-consuming, and automatic stacking is restricted to one crate type per stacking apparatus.

A crate-stacking system for the automatic stacking of crates, optionally beverage crates, and a crate-stacking apparatus are realized which can automatically stack a multiplicity of different crates.

The expression "crate" that is used here may refer for example to beverage crates in which, for example, full or empty beverage containers, for example cans and/or bottles, can be accommodated. Furthermore, the expression "crate(s)" may refer to any type of transport aids, for example crates from the foodstuffs industry (for example E1, E2 or E3 crates), lattice boxes, trays, pallets, canisters, barrels etc.

A crate-stacking system according to an embodiment may have a multiplicity of crates (for example crates of empties) and a crate-stacking apparatus.

A crate may for example have an at least substantially rectangular outline with a longitudinal direction and a transverse/width direction and may extend perpendicular (for example in a crate-stacking direction) to said outline. A crate of said type may for example be approximately 15 cm to 45 cm wide, approximately 20 cm to 45 cm long and approximately 15 cm to 40 cm tall. The crate may optionally be 30 cm wide, 40 cm long and 30 cm tall. The crate has an upper insertion opening for the insertion of articles (for example empties). The upper insertion opening is situated opposite a base with an underside. At the underside, the crate may be equipped, at at least two opposite sides (for example the longitudinal sides, for example also all sides) with a respective, for example elongate projection (for example a contact projection or a contact edge) which extends downward from the underside and with a lateral spacing to a respectively associated outer longitudinal edge of the base. At the for example two mutually opposite sides of the crate, there may thus be provided for example a laterally outwardly open engagement longitudinal recess which is delimited by the underside of the base and by the elongate projection. For example, the engagement longitudinal recess may also be provided at all sides of the crate. That is to say, the engagement longitudinal recess has for example a rectangular cross section (height×depth) of approximately 0.5 cm to 1.5 cm by approximately 1 cm to 3 cm, optionally of approximately 1 cm by 2 cm. The rectangular cross section extends along the outer longitudinal edge, wherein the height defines an engagement height and the depth defines an engagement depth. A crate of said type can be stacked in the crate-stacking direction (for example a vertical direction, that is to say the direction of gravitational force) onto another crate. For this purpose, the elongate projection of the upper crate can engage for example into the insertion opening of a lower crate, whereby an at least substantially form-fitting connection of the two crates is realized.

The crate-stacking apparatus may have: a crate conveying apparatus, a crate lifting apparatus and a control apparatus.

The crate conveying apparatus may be provided with a conveying path (for example a conveyor belt or several parallel conveyor or chain belts, a roller conveyor, etc.) which defines a conveying surface. On the conveying surface, the crates are transportable in a conveying direction (or counter to said conveying direction, for example in the case of an alternating conveying direction). The conveying surface may have a crate feed section onto which the crates can be fed, a crate stacking section in which the crates can be stacked, and a crate discharge section, from which the stacked crates can be discharged. The crate conveying apparatus may be designed to convey the (for example individual) crates from the crate feed section to the crate stacking section and to convey the stacked crates from the crate stacking section to the crate discharge section. For example, the individual sections described above may be arranged in the stated sequence. It is also possible for the crate feed section to simultaneously be the crate discharge section.

The crate lifting apparatus may be arranged at the crate stacking section and may, on opposite sides of the conveying path, have gripping elements. For example, the crate lifting apparatus may be arranged symmetrically at both sides of the conveying path, or else may be arranged only at one side. For example, two gripping elements are arranged on each conveying path side; however, an arrangement is also possible with only one gripping element, which is for example elongate in the conveying direction, per conveying path side. Furthermore, multiple gripping elements, for example three, four, five or more per side, are also possible.

The gripping elements are for example movable toward one another and away from one another in a gripping direction at least substantially parallel to the conveying surface (for example independently of one another or synchronously with respect to one another). The gripping elements are for example driven individually or collectively in a manner coupled in terms of motion, for example by means of an electric motor or a pneumatic actuator, or the gripping elements are for example preloaded by spring force in a movement direction. Furthermore, the gripping elements are movable upward and downward synchronously in the crate-stacking direction at least substantially perpendicular to the conveying direction, for example by means of an electric motor or a pneumatic actuator. For example, said upward/downward synchronous movement is realized by means of mechanical coupling of the gripping elements at both sides of the conveying path.

Furthermore, each gripping element may have a free end with a gripping finger which projects laterally toward the conveying path and which, in the crate-stacking direction, has an engagement thickness which is at least substantially equal to or smaller than the engagement height of the engagement longitudinal recess. The engagement thickness may correspond to the engagement height for example directly adjacent to the elongate projection. The engagement thickness is for example equal to or smaller than the engagement height of the crate type with the smallest engagement height. The crate can thus be grippable at mutually opposite sides (for example the longitudinal sides or the face sides oriented transversely with respect thereto) by the gripping fingers by virtue of the gripping fingers engaging, at the mutually opposite sides, into the associated engagement longitudinal recesses. Thus, the different crate types can be stacked by means of a crate-stacking apparatus independently of further geometrical features of the crate (for example height, any projections, engagement openings etc.).

The control apparatus may be connected to the crate conveying apparatus and to the crate lifting apparatus and may have a sensor (for example a camera, a laser scanner etc.) which detects a type of the crate and/or a position of the crate in the crate stacking section. The control apparatus may furthermore be designed to control the crate conveying apparatus and the crate lifting apparatus in a manner coordinated with one another such that a process can be repeatedly performed in which:

- a crate situated in the crate stacking section on the conveying surface can be gripped, for example at the two longitudinal sides, and lifted by the gripping elements,
- a new crate is conveyed into the crate stacking section below the lifted crate,
- the lifted crate is set down onto the new crate, and the stacked crates are transported out of the crate stacking section, or
- the new crate is in turn gripped by the gripping elements and lifted together with the one or more previous crates set down thereon,
- a further crate is conveyed into the crate stacking section, onto which crate the lifted crates are then set down, and
- the stacked crates are transported out of the crate stacking section.

In this way, it is possible for multiple, for example two, three, four, five and more crates to be stacked one on top of the other.

Each of the gripping elements may have a lateral abutment shoulder which is formed with a shoulder spacing, in the movement direction of the gripping element, to a free end of the associated gripping finger. For example, the abutment shoulder may also be formed as a projection which projects at the top side of the gripping element. The shoulder spacing may be smaller than the lateral engagement depth of the engagement longitudinal recess, such that, when the respective gripping finger engages into the associated engagement longitudinal recess, the abutment shoulder is in abutting contact with a side surface (for example a longitudinal or face side surface) of the crate. The crate can thus be securely gripped by means of the contact of the abutment shoulder against the side surface of the crate, and lifted by means of the gripping finger, which is in contact with the underside of the base.

At each side of the conveying path, there may be provided a single gripping element with a single gripping finger, which is for example of elongate form in the direction of the conveying path. For example, the gripping finger may have an elongate L shape, wherein the horizontal limb of the L shape makes contact with the base of the crate, and the vertical limb of the L shape forms the abutment shoulder and makes contact with the side surface of the crate.

The movement of the gripping elements toward one another and away from one another may be a pivoting movement about a spindle which is either at least substantially perpendicular or parallel to the conveying surface. Furthermore, said movement may also be realized as a linear movement. For example, in the case of a horizontal pivot spindle, the crate can be gripped at its longitudinal sides. However, for example in the case of a vertical pivot spindle by means of which the gripping elements are pivoted to the face sides of the crate from the side, the crate can be gripped at its face sides.

The movement of the gripping elements toward one another and away from one another may be controllable independently by the control apparatus, for example in order for the crate to be selectively contacted, and aligned on the conveying surface, by means of the gripping fingers in the crate stacking section before the lifting process. However, it is also possible for the gripping elements to be, for example, mechanically coupled to one another or to be controlled by the control apparatus so as to perform their movements synchronously with respect to one another.

The crate lifting apparatus may have, at the opposite sides of the conveying path, one or more centering elements (for example centering levers or panels). The centering elements are for example movable toward one another and away from one another in a centering direction, for example at least substantially parallel to the conveying surface. The centering elements are for example driven individually or collectively, for example by means of an electric motor or a pneumatic actuator. Each centering element may have an upper centering section and a lower centering section, which are each oriented laterally with respect to the conveying path. The centering sections serve, for the centering of the previous (for example lifted) crate/crates with respect to a new crate (for example a crate standing in the crate stacking section), to be able to laterally make contact with a respectively associated side surface of the previous crates/crates and a respectively associated side surface of the new crate. It is thus possible to realize reliable insertion of the projection of the upper crate into the insertion opening of the lower crate.

The centering elements may be mechanically coupled in terms of motion to the gripping elements in order to mechanically synchronize the movement of the centering elements with the movement of the gripping elements. However, such a synchronous movement may also be realized through corresponding control of the individual centering elements by the control apparatus.

The crate feed section may also be the crate discharge section. It is consequently possible for individual crates and crate stacks to be led into/out of the crate stacking section via the same section. The crate feed section and the crate discharge section may for example also be arranged, with respect to the crate lifting apparatus, such that the crates are conveyed into the crate lifting apparatus at one side by means of the crate feed section, are stacked in the crate stacking section or pass through said crate stacking section without stacking, and are discharged at the other side of the crate lifting apparatus by means of the crate discharge section.

The conveying path may have a conveying path main section and multiple crate stacking sections which are arranged laterally adjacent to the conveying path main section. Here, the crate feed section of a respective crate stacking section is for example also the crate discharge section, and may overlap the conveying path main section. The conveying path may for example be formed from different types of conveying paths, for example roller conveyors, conveyor belts, chain belt conveyors, etc., which may have different angles relative to one another. The crate-stacking apparatus may have multiple crate lifting apparatuses which are respectively assigned to the crate stacking sections.

For example, two crate stacking sections are arranged on mutually opposite sides of the conveying path main section. Such an arrangement may for example occupy a footprint which corresponds for example at least substantially to the dimensions of a Euro pallet (1200×800 mm). Furthermore, the footprint may also be for example at least substantially 1400×800 mm.

A crate-stacking apparatus for the automatic stacking of crates according to an embodiment may have a crate conveying apparatus, a crate lifting apparatus and a control apparatus. For this purpose, the crate conveying apparatus, the crate lifting apparatus and the control apparatus may be designed as described above.

Embodiments of the invention are illustrated in the figures and will be discussed in more detail below.

BRIEF DESCRIPTION OF THE DRAWINGS

In the figures:

FIG. 3D shows a plan view of an embodiment of the gripping element and the elongated gripping finger of the gripping element.

FIG. 3E shows a perspective view of an embodiment of the gripping element and the elongated gripping finger of the gripping element.

DETAILED DESCRIPTION

In the following detailed description, reference is made to the appended drawings, which form a part of this description and which, for illustrative purposes, show specific embodiments in which the invention can be implemented. In this regard, directional terminology such as for example "top", "bottom", "forward", "rearward", "front", "rear" etc. are used with reference to the orientation of the described figure(s). Since components of embodiments can be positioned in a number of different orientations, the direction terminology serves for illustration and is in no way restrictive. It is self-evident that other embodiments may be used and structural or logical modifications may be made without departing from the scope of protection of the present invention. It is self-evident that the features of the various embodiments described herein may be combined with one another unless specifically stated otherwise. The following detailed description therefore should not be regarded in a limiting sense, and the scope of protection of the present invention is defined by the appended claims.

In the context of this description, the expressions "connected", "attached" and "coupled" are used to describe both a direct and an indirect connection, a direct or indirect attachment and a direct or indirect coupling. In the figures, identical or similar elements are denoted by the same reference designations where expedient.

Figure 1:
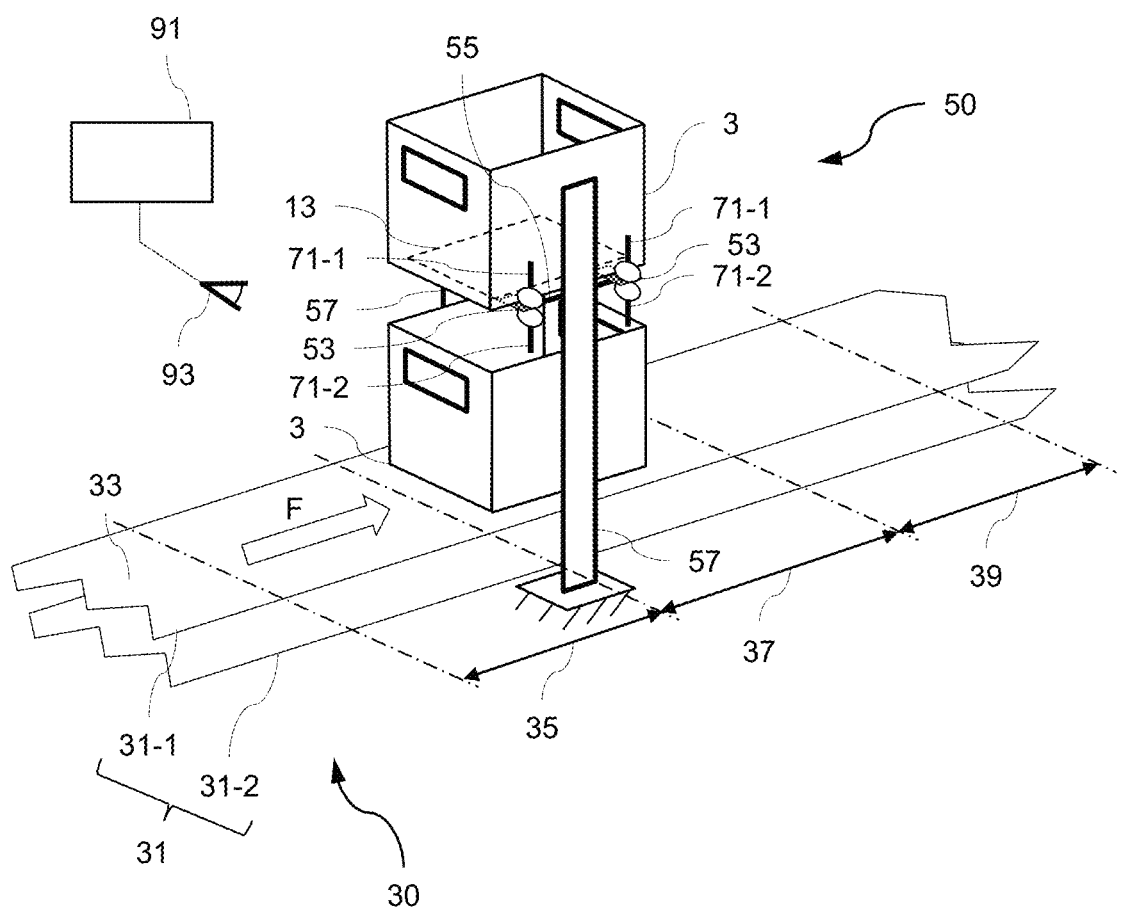
FIG. 1 shows a perspective schematic view of a crate-stacking system according to an embodiment.
Figure 2:
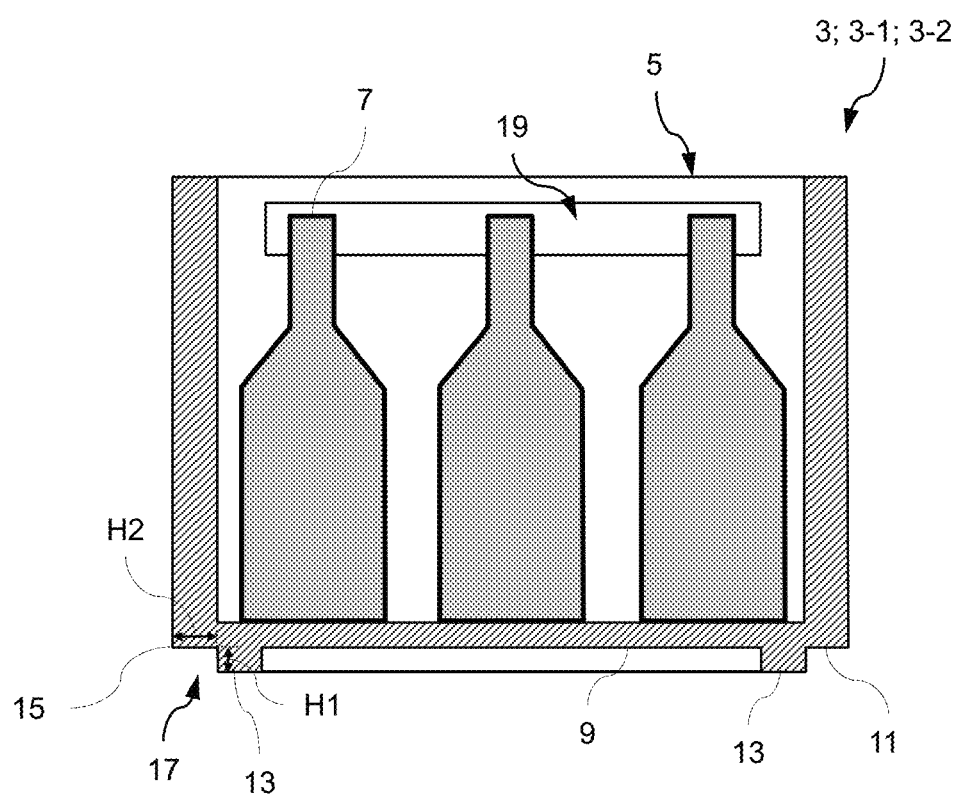
FIG. 2 shows a schematic sectional view of a stackable crate which is stacked for example by the crate-stacking system shown in FIG. 1.

FIG. 1 shows a crate-stacking system 1 according to an embodiment, and FIG. 2 shows a section (cross section) through a crate 3 which can be stacked by means of the crate-stacking system 1.

The crate 3 shown in FIG. 1 and FIG. 2 has a rectangular outline with a longitudinal direction (perpendicular to the section plane in FIG. 2) and a width direction (left-right direction in FIG. 2) and extends perpendicular to said outline in a crate-stacking direction (top-bottom direction in FIG. 2). At a top side of the crate 3 there is formed an insertion opening 5 through which, for example, bottles 7 can be inserted into the crate 3. Furthermore, the insertion opening serves for receiving a projection of another crate when the other crate is stacked onto the crate 3. The insertion opening 5 is situated opposite a base 9 with an underside 11. At the underside 11, the crate is equipped, at the two opposite longitudinal sides, with a respective elongate projection 13. The projection 13 extends downward from the underside 11 and with a lateral spacing to an associated outer longitudinal edge 15 of the base 9. At the two mutually opposite longitudinal sides of the crate 3, there is thus formed a laterally outwardly open engagement longitudinal recess 17 which is delimited by the underside 11 of the base 9 and by the respective elongate projection 13. In this case, the engagement longitudinal recess 17 is for example formed at all four sides of the crate 3 (longitudinal sides and face sides). Here, the engagement longitudinal recess 17 has a rectangular cross section with an engagement height H1 and an engagement depth H2. Furthermore, the crate 3 has a carrying opening 19 by means of which the crate 3 can be carried by persons.

The crate-stacking system 1 shown in FIG. 1 has a crate conveying apparatus 30 which is provided with a conveying path designed as a conveyor belt 31. The conveyor belt 31 has an upper run 31-1 (transport run) and a lower run (return run) 31-2. Further components of the crate conveying apparatus 30, for example carrying rollers, a drive motor, etc., are not illustrated in FIG. 1, but are well known, such that a description thereof will not be given. The upper run 31-1 forms a conveying surface 33 on which the crates 3 are transported in a conveying direction F of the upper run 31-1. The conveying surface 33 is provided with a crate feed section 35 onto which the crates 3 can be fed, a crate stacking section 37 in which the crates 3 can be stacked, and a crate discharge section 39 from which the stacked crates 3 can be discharged. In FIG. 1, said sections 35, 37, 39 directly adjoin one another. It is however also possible for the crate feed section 35 and the crate discharge section 39 to be spatially separate from the crate stacking section 37, for example arranged at the start/end of the conveyor belt 31. The conveyor belt 31 is designed so as, on the upper run 31-1, to transport the (for example individual) crates 3 from the crate feed section 35 to the crate stacking section 37 and to transport the stacked crates 3 from the crate stacking section 37 to the crate discharge section 39. The feed of the individual crates 3 and the discharge of the (for example stacked) crates 3 into/out of the crate-stacking system 1 is not described in any more detail here, but may be realized for example by means of further conveyor belts.

The crate-stacking system 1 is furthermore provided with a crate lifting apparatus 50 which will be discussed with reference to FIG. 1 and FIG. 3A and FIG. 3B.

The crate lifting apparatus 50 is arranged on both sides at the crate stacking section 37 at the conveyor belt 31 and, on opposite sides of the conveyor belt 31, has in each case two gripping elements 53. The gripping elements 53 are movable toward one another and away from one another in a gripping direction parallel to the conveying surface. The gripping elements 53 are in this case driven for example individually by means of an electric motor (not shown) which generates a linear movement of the gripping elements 53. Furthermore, the gripping elements 53 are movable upward and downward synchronously in the crate-stacking direction perpendicular to the conveying direction F. For this purpose, the gripping elements 53 (together with electric motors which are not shown) are arranged at one side of the conveyor belt 31 on a carrier 55 which is movable upward and downward in the crate-stacking direction by means of a lifting system 57, for example a belt lifting system or a toothed gear-toothed rack lifting system. A lifting system of said type is well known, such that a description thereof will not be given.

Figure 3A:
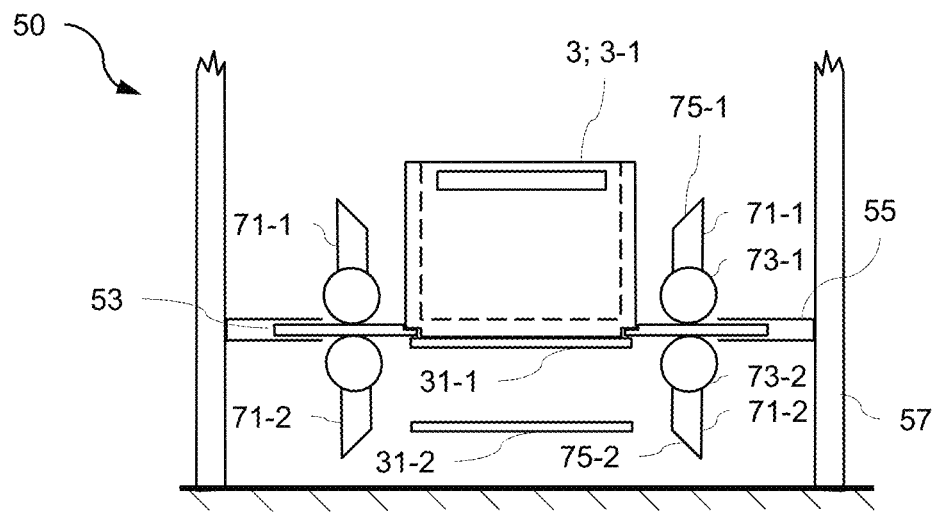
FIG. 3A shows a schematic front view of the crate-stacking system shown in FIG. 1, with gripping elements in an engagement position before the lifting of a crate.
Figure 3B:
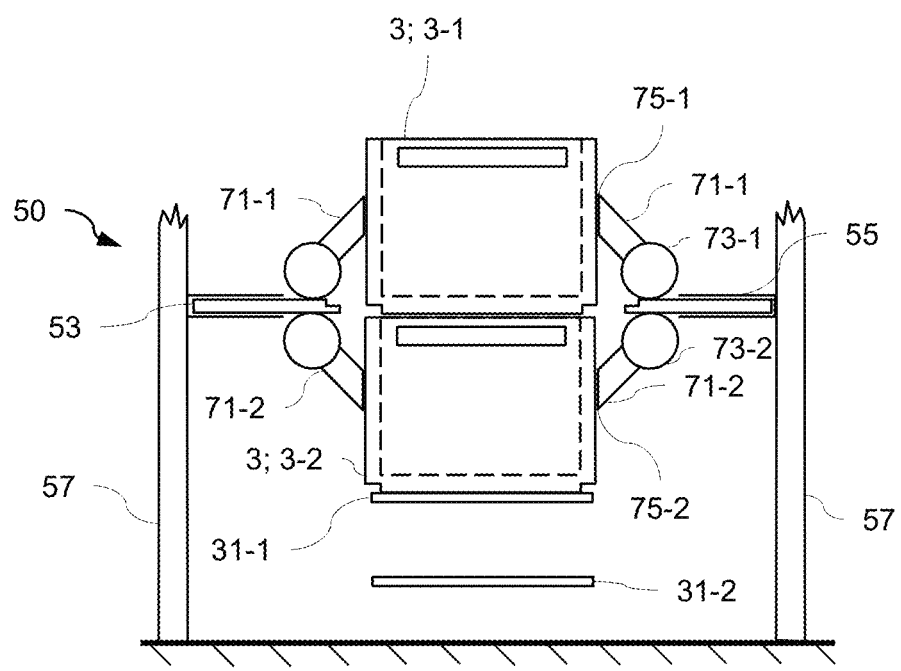
FIG. 3B shows a schematic front view of the crate-stacking system shown in FIG. 1, in a setting-down position during the setting-down/stacking of the lifted crate.
Figure 3C:
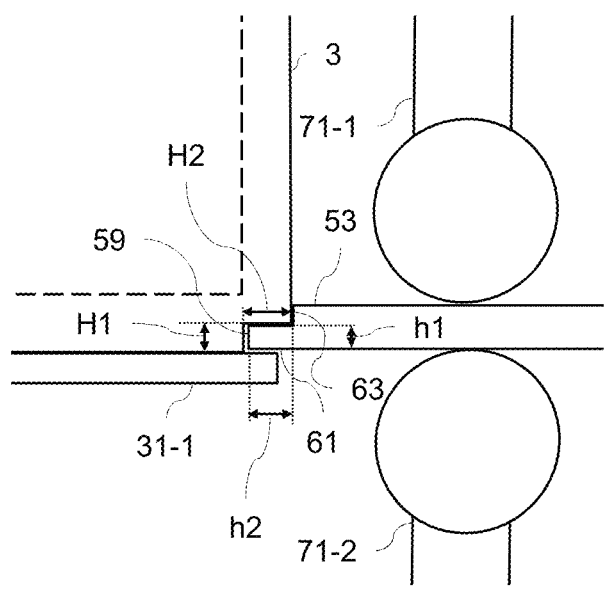
FIG. 3C shows a schematic detailed view of the gripping element shown in FIG. 3A, in engagement with the crate.

As shown in FIG. 3C, each gripping element 53 has a free end 59 with a gripping finger 61 which projects laterally toward the conveyor belt 31. The gripping finger 61, in the crate-stacking direction, has an engagement thickness h1 which in this case is smaller than the engagement height H1 of the engagement longitudinal recess 17. The gripping element 53 furthermore has a lateral abutment shoulder 63 on its top side, which abutment shoulder is formed with a shoulder spacing h2 to the free end 59 of the associated gripping finger 61. Here, the shoulder spacing h2 is smaller than a lateral engagement depth H2 of the engagement longitudinal recess 17. Consequently, when the respective gripping finger 61 engages into the associated engagement longitudinal recess 17, the abutment shoulder 63 is in abutting contact with a longitudinal side surface of the crate 3, and the gripping finger 61 is in contact with the underside 11 of the base 9 but not with the projection 13. The gripping elements 53 are thus capable, by means of their associated gripping finger 61 and their associated abutment shoulder 63, of securely gripping the crate 3 and lifting said crate by means of the lifting system 57 (the gripping and lifting of the crate will be described in more detail below).

As is furthermore shown in FIG. 1 and FIG. 3A and FIG. 3B, the crate lifting apparatus 50 is provided with upper and lower centering elements 71-1 and 71-2 which correspond to the gripping elements 53. Consequently, at both sides of the conveyor belt 31, in each case four centering elements 71-1, 71-2 are provided adjacent to the crate stacking section 37. The upper centering element 71-1 is arranged above the gripping element 53 in the crate-stacking direction, and the lower centering element 71-2 is arranged below the gripping element 53 in the crate-stacking direction. The centering elements 71-1, 71-2 are movable toward one another and away from one another in a centering direction. For this purpose, the centering elements 71-1, 71-2 are mechanically coupled in terms of motion to the associated gripping element 53. That is to say, a wheel section 73-1, 73-2 of a centering element 71-1, 71-2 rolls on a top side or bottom side respectively of the associated gripping element 53, such that, during movement of the gripping element 53, the associated centering elements 71-1, 71-2 are pivotable between a release position (see FIG. 3A) and a centering position (see FIG. 3B). The upper centering element 71-1 furthermore has an upper centering section 75-1, and the lower centering element 71-2 furthermore has a lower centering section 75-2. The centering sections 75-1, 75-2 are oriented laterally toward the conveyor belt 31 and serve for making contact with the longitudinal side surfaces of the crate(s) 3 in the centering position.

As shown in FIG. 1, the crate-stacking system 1 furthermore has a control apparatus 91 which is connected to the crate conveying apparatus 30 and to the crate lifting apparatus 50 (the connection is not shown in FIG. 1). Furthermore, the control apparatus has a sensor 93, for example a camera system or a laser scanner, which detects the type and/or the position of the crate 3 in the crate stacking section 37 and transmits this information to the control apparatus 91. The control apparatus 91 is designed so as, on the basis of the crate type and/or the position of the crate in the crate stacking section 37 as detected by the sensor 93, to control the crate conveying apparatus 30 and the crate lifting apparatus 50 such that the crates 3 are stacked.

Below, a stacking process of said type will be described with reference to FIG. 1 and FIG. 3A and FIG. 3B. For the descriptions of the stacking process, reference will be made not to the crate 3 but to a first, a second and a third crate 3-1, 3-2 and 3-3, which are however clones of the crate 3.

The individual first crate 3-1 is fed by the conveyor belt 31 into the crate stacking section 37, and the type and/or the position of the crate are detected by the sensor 93. In this state, the gripping elements 53 are out of engagement with the first crate 3-1, and the centering elements 71-1, 71-2 are situated close to their centering position. Consequently, the first crate 3-1 is not contacted by the gripping elements 53 and the upper centering elements 71-1. Then, the gripping elements 53 are moved away from one another individually, independently of one another, by the control apparatus 91. Said movement has the effect that the upper centering elements 71-1 pass, with their upper centering sections 75-1, into the centering position, so as to make contact with the longitudinal side surfaces of the first crate 3-1. Thus, the first crate 3-1 in the crate stacking section 37 is aligned for the lifting process, that is to say the first crate 3-1 is, after the alignment, positioned at least substantially parallel to the conveying direction F and in front of the gripping elements 53. The "correct gripping position" for the first crate 3-1 is thus set.

The gripping elements 53 are now placed in engagement with the engagement longitudinal recess 17 of the first crate 3-1 by the control apparatus 91, wherein, at the same time, the upper centering elements 71-1, 71-2 move into the release position. The first crate 3-1 is now securely gripped by the gripping elements 53 (see FIG. 3A), and the upper centering elements 71-1 are not in contact with the first crate 3-1. The lower centering elements 71-2 are not involved in the lifting of the first crate 3-1.

The lifting system 57 then lifts the gripping elements 53 together with first crate 3-1 synchronously upward in the crate-stacking direction, such that a free space for the second crate 3-2 is created below the crate 3-1 in the crate stacking section 37. The second crate 3-2 is conveyed into the crate stacking section 37 by the conveyor belt 31, and a position of the second crate 3-2 is detected by the sensor 93, and said position is if necessary corrected in the conveying direction F by means of the conveyor belt 31.

The lifting system 57 subsequently moves the gripping elements 53 together with first crate 3-1 synchronously downward toward the second crate 3-2, such that the gripping fingers 61 are positioned adjacent to the top side of the second crate 3-2. For example, the gripping fingers 61 may make (slight) contact with the top side of the second crate 3-2.

The gripping elements 53 are then disengaged from the engagement longitudinal recess 17 (are moved away from one another), wherein, at the same time, the upper and the lower centering elements 71-1, 71-2 make contact with the side surfaces of the first crate 3-1 and of the second crate 3-2 respectively (see FIG. 3B). This contact serves for aligning the second crate 3-2 relative to the first crate 3-1 (lower centering elements 71-2) and serves for stabilizing the first crate 3-1 during the disengagement of the gripping elements 53 (upper centering elements 71-2). Consequently, the first crate 3-1 is inserted with its projection 13 into the insertion opening 5 of the second crate 3-2 and is set down onto the first crate 3-1.

In this state, it is either possible for the stacked crates 3-1, 3-2 to be transported out of the crate stacking section 37, or another stacking process can be commenced in order to stack the crates 3-1, 3-2 onto the third crate 3-3. In both cases, two positions of the centering elements 71-1, 71-2 are possible:

The centering elements 71-1, 71-2 remain situated in the centering position and, as the crates 3-1, 3-2 are transported out of the crate stacking section 37 or during the downward movement of the gripping elements 53, said centering elements make slight contact with the crates 3-1, 3-2 so as to continue to center/laterally support said crates. This stabilizes the crate stack for example during the downward movement of the gripping elements 53.

The centering elements 71-1, 71-2 are pivoted into a position between the centering position and the release position, so as to no longer make contact with the crates 3-1, 3-2. Thus, a region between the centering elements 71-1, 71-2 is realized which is larger (wider) than the width of the crate stack. This, for example during the introduction of the third crate 3-3 into the crate stacking section 37, permits a greater tolerance with regard to an imprecisely positioned third crate 3-3. Here, the gripping elements 53/centering elements 71-1, 71-2 may be moved downward before, after or during the introduction of the third crate 3-3 into the crate stacking section 37.

Figure 4A:
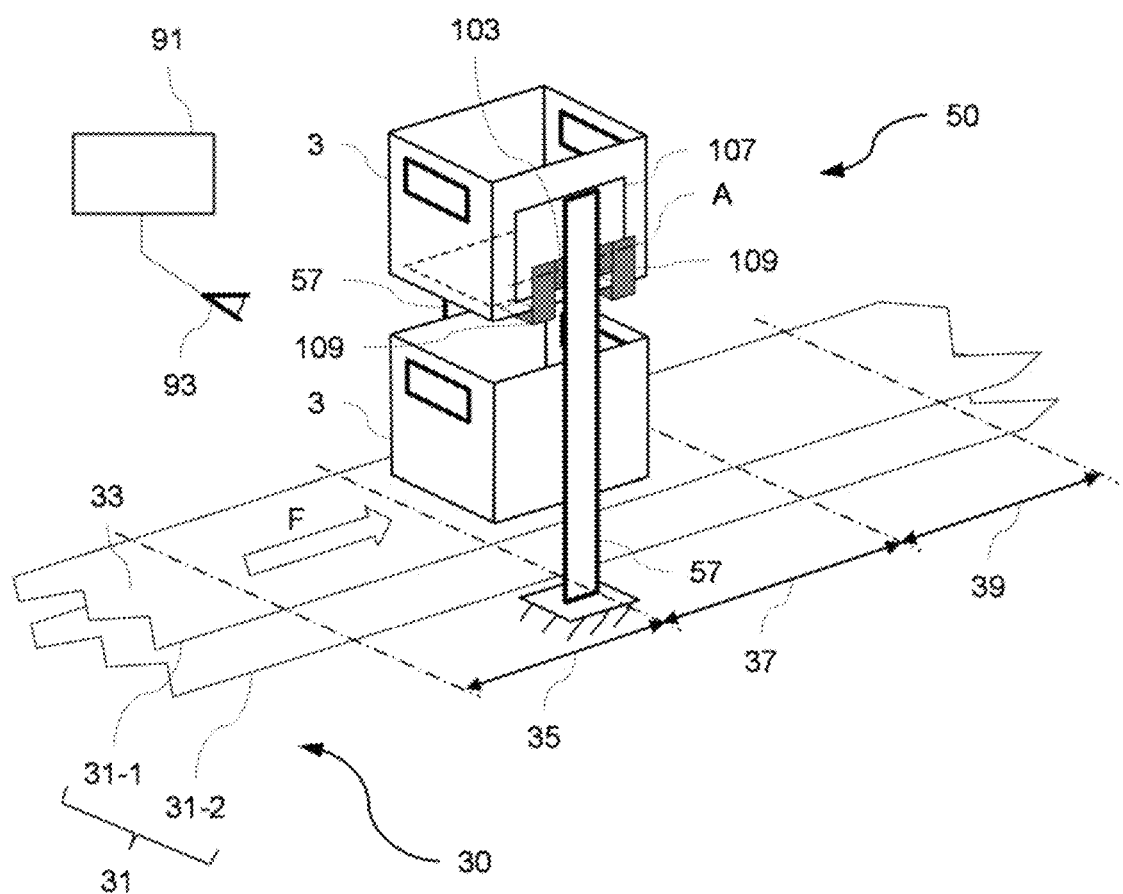
FIG. 4A shows a perspective, schematic view of a crate-stacking system according to a further embodiment.
Figure 4B:
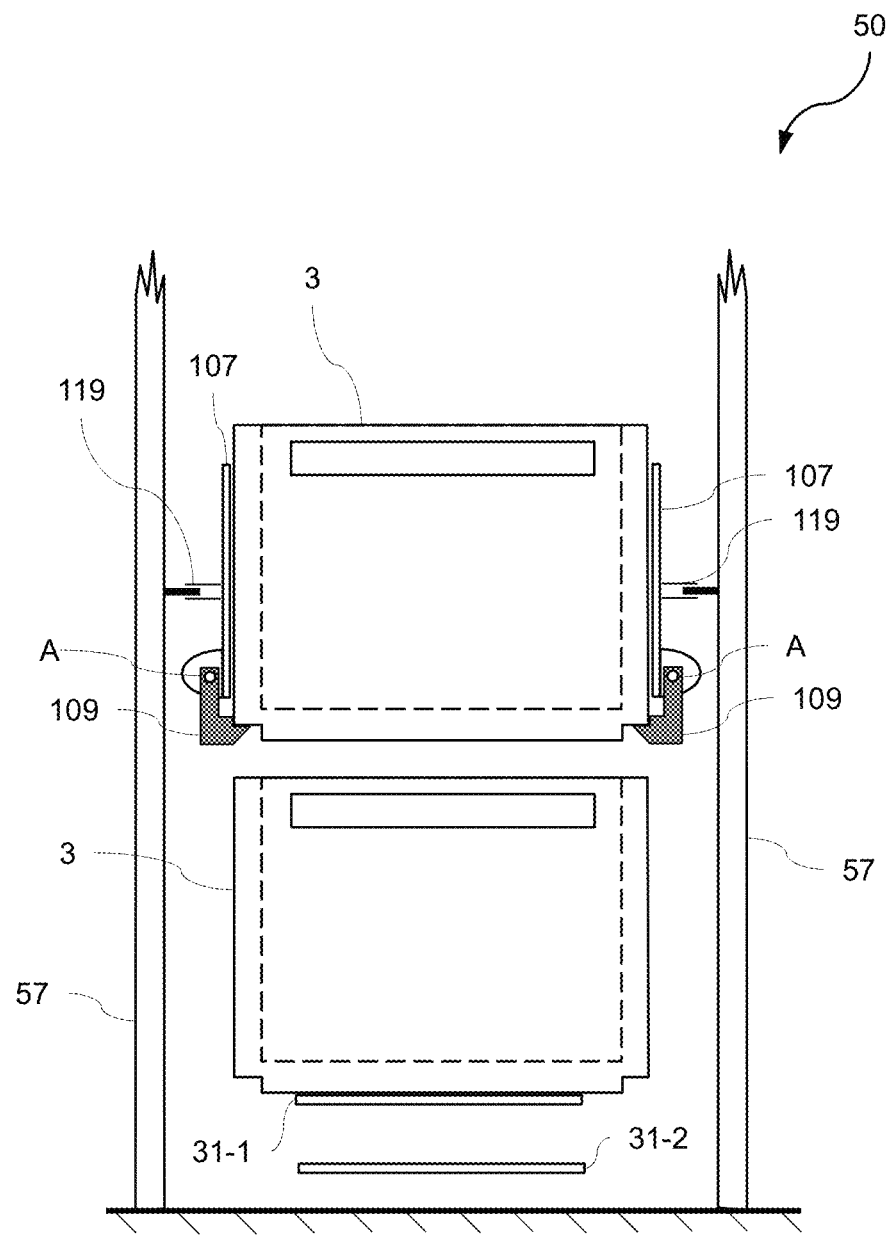
FIG. 4B shows a schematic front view of the crate-stacking system shown in FIG. 4A.

FIG. 4A shows a crate-stacking system according to a further embodiment, and FIG. 4B shows a detail view of a gripping element of the crate-stacking system of FIG. 4A. The crate-stacking system of this embodiment is identical to the crate-stacking system of the preceding embodiment aside from the gripping elements and the centering elements, such that only the arrangement and the function of the gripping and centering elements will be described here. For the other aspects of the crate-stacking system, reference is made to the description above.

The crate lifting apparatus 50 has, on opposite sides of the conveyor belt 31, in each case one gripping element 103 which is elongate in the conveying direction F. The gripping element 103 is pivotable in a gripping direction about a gripping element pivot spindle A (see FIG. 4C), such that the two gripping elements 103 are pivotable toward one another and away from one another. The gripping element pivot spindle A is arranged parallel to the conveying direction F of the conveyor belt. For example, a spring (not shown) preloads the two gripping elements 103 so as to generate a force which pushes the two gripping elements 103 in the direction toward one another. It is likewise possible for the gripping elements 103 to be driven/preloaded by means of an electric motor. By means of the gripping element pivot spindle A, the gripping elements 103 are pivotably connected to an associated carrying and centering element 107. Here, the gripping element 103 and the carrying and centering element 107 on one side of the conveyor belt 31 are movable upward and downward in the crate-stacking direction perpendicular to the conveying direction F by means of the lifting system 57 synchronously with respect to the gripping element 103 and with respect to the carrying and centering element 107 on the other side of the conveyor belt 31.

Figure 4C:
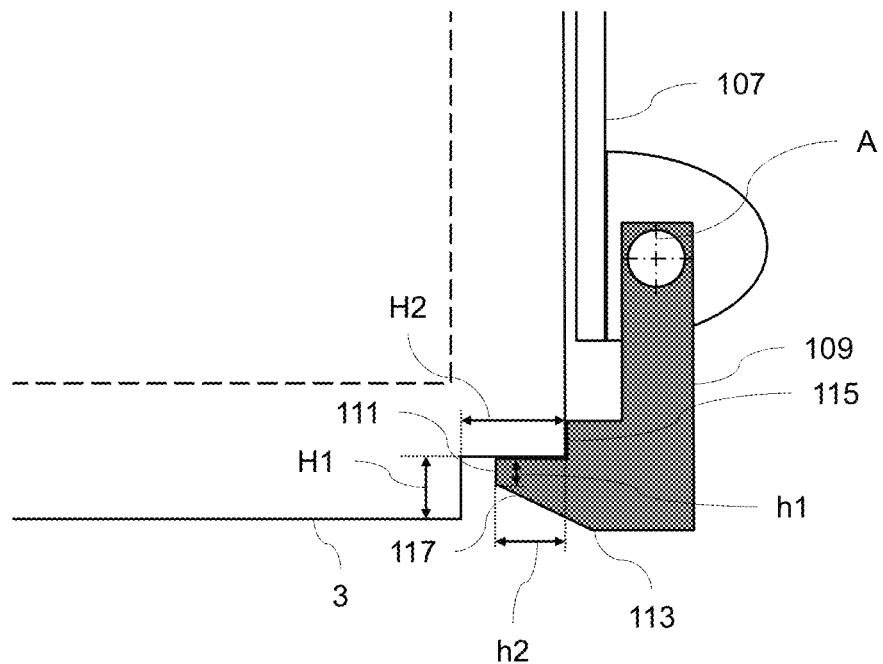
FIG. 4C shows a schematic detailed view of the gripping element shown in FIG. 4B, in engagement with the crate.

As shown in FIG. 4A, FIG. 4B and FIG. 4C, each gripping element 103 is equipped, in its conveying direction end regions, with a respective gripping section 109. The gripping section 109 is of substantially L-shaped design. The lower (horizontal) limb of the gripping section 109 has a free end 111 with a gripping finger 113 which projects laterally toward the conveyor belt 31. The upper (vertical) limb of the gripping section 109 is extended through by the gripping element pivot spindle A. By means of the gripping element pivot spindle A, the gripping section 109 or the gripping element 103 is connected to, and pivotable relative to, the carrying and centering element 107.

The gripping finger 113 has, at its free end 111, an engagement thickness h1 which in this case is smaller than the engagement height H1 of the engagement longitudinal recess 17. The lower (horizontal) limb of the gripping section 109 furthermore has a lateral abutment shoulder 115 at its top side, which abutment shoulder is formed with a shoulder spacing h2 to the free end 111 of the associated gripping finger 113. Here, the shoulder spacing h2 is smaller than a lateral engagement depth H2 of the engagement longitudinal recess 17. Consequently, when the respective gripping finger 113 engages with the associated engagement longitudinal recess 17, the abutment shoulder 115 is in abutting contact with the longitudinal side surface of the crate 3, and the gripping finger 113 is in contact with the underside 11 of the base 9. The gripping elements 103 are thus capable, by means of their gripping sections 109, that is to say the associated gripping fingers 113 and the associated abutment shoulders 115, of securely gripping the crate 3 and lifting said crate by means of the lifting system 57. Furthermore, an underside of the gripping finger 113 is, between its free end 111 and outward beyond the abutment shoulder 115, formed as a ramp 117. That is to say, the gripping finger 113 has, proceeding from its free end 111 toward the abutment shoulder 115, a thickness which in this case continuously increases. The angle thus formed between the top side and the underside of the gripping finger 113 is for example approximately between 30° and 60°, and is for example optionally 45°. The ramp 117 serves, during the setting-down of the first crate 3-1 onto the second crate 3-2, for coming into contact with an upper circumferential edge of the second crate 3-2 and, as the setting-down movement progresses, pushing the gripping element 103 outward (away from one another) such that the gripping element 103 disengages from the first crate 3-1. Consequently, an engagement of the gripping elements 103 with the crate 3 is realized by means of a spring force or other actuators (for example pneumatic or electric actuators), and the disengagement of the gripping elements 103 from the crate 3-1 is realized counter to the spring force by means of a sliding movement of the ramps 117 on the upper circumferential edge of the crate 3-1.

As is also shown in FIG. 4A and FIG. 4B, the gripping element 103 is pivotably connected to the carrying and centering element 107. The carrying and centering element 107 is in this case in the form of a plate and is provided adjacent to the crate stacking section 37 on both sides of the conveyor belt 31. The carrying and centering element 107 makes contact with the side surfaces of the crate 3, such that the crate 3 (which is to be lifted/has been lifted) is thereby centered. For this purpose, the carrying and centering element 107 is movably connected to the crate lifting apparatus 50 by means of an adjustment apparatus 119. The adjustment device is movable for example by means of an electric motor or a pneumatic actuator (neither of which is shown). The adjustment device 119 serves for moving the carrying and centering element 107 for example at least substantially parallel to the conveying surface 33. Alternatively, the adjustment apparatus 119 may also be a pivoting apparatus which can pivot the carrying and centering element 107 toward and away from the crate 3, for example about a pivot spindle parallel to the conveying direction F. Thus, the carrying and centering elements 107 provided on both sides of the conveyor belt 31 can be moved toward one another and away from one another. However, the carrying and centering elements 107 may for example also be designed as guide elements which are not movable toward and away from one another.

It is however also possible for a combination of the gripping and centering elements described for this embodiment to be used together with, or instead of, the gripping and centering elements used in the embodiment described further above.

Figure 5:
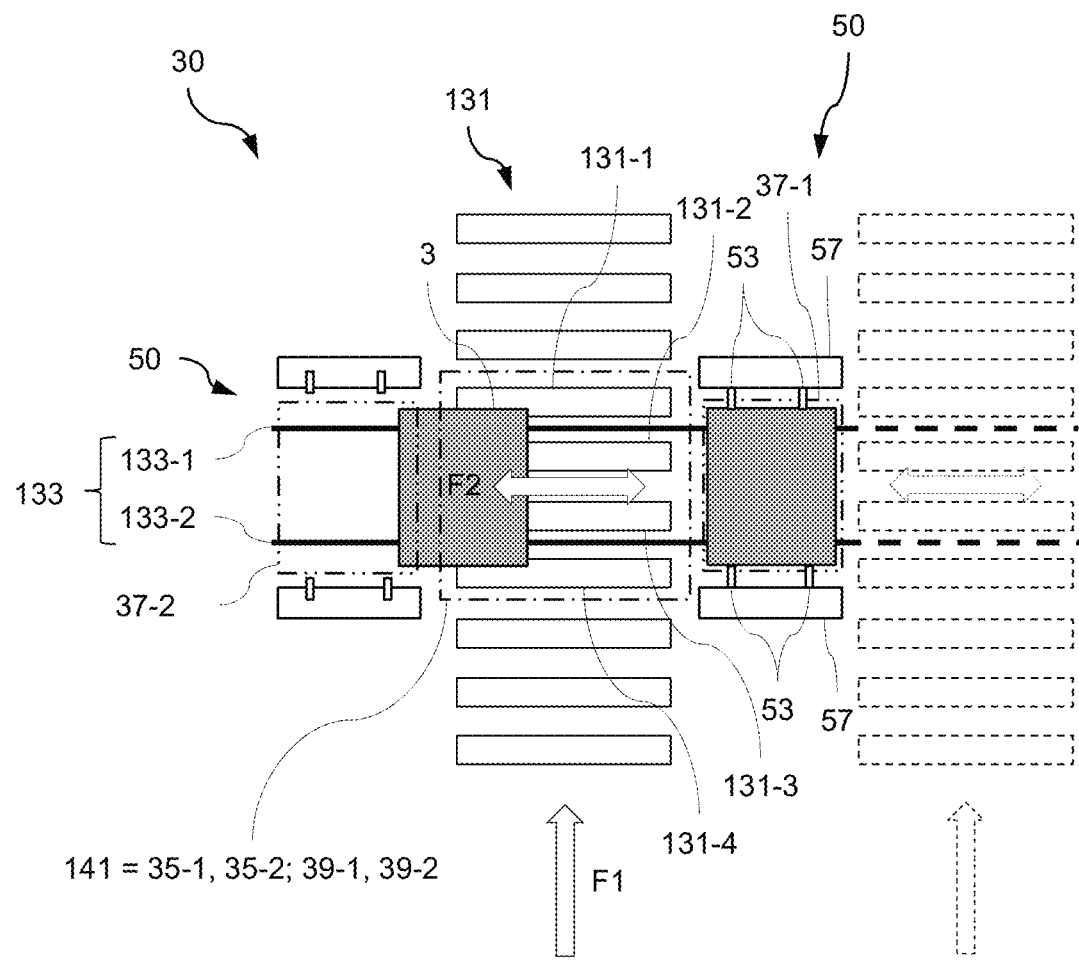
FIG. 5 shows a schematic plan view of a crate-stacking system according to a further embodiment.

FIG. 5 shows a crate-stacking system of an embodiment in a plan view. The crate-stacking system shown here uses multiple crate stacking sections and illustrates an arrangement thereof. The above-described components of "crate lifting apparatus" and "control apparatus" are used here and will hereinafter be explicitly described no further.

Here, the conveying path of the crate conveying apparatus 30 is in the form of a roller conveyor 131 and a belt conveyor or chain conveyor 133. The individual rollers of the roller conveyor 131 form, at their top sides, a roller conveyor conveying surface on which the crates 3 are transported in a conveying direction F1. The conveying direction F1 is in this case merely an example; a different conveying direction, or alternating conveying directions, are likewise possible. Since a roller conveyor of said type is well known, a further description thereof will be omitted. The belt conveyor 133 has two conveyor belts or chain belts 133-1, 133-2 which run parallel to one another, which extend at right angles to the roller conveyor 131, and which extend through a respective intermediate space between two adjacent rollers 131-1 and 131-2 or 131-3 and 131-4 of the roller conveyor 131. That is to say, the belt conveyor 133 crosses the roller conveyor 131 at right angles and conveys crates 3 in a conveying direction F2. The top sides of the conveyor belts 133-1, 133-2 form the conveying surface 33 (also referred to here as a belt conveyor conveying surface), which is arranged below the roller conveyor conveying surface. For example, the two conveying surfaces may also be arranged at least substantially in the same plane. The belt conveyor conveying surface 33 can be selectively raised above the roller conveyor conveying surface (for example in the manner of a chain transfer apparatus) by the control apparatus 91. For example, the sensor 93 can detect the crates 3 transported on the roller conveyor 131, such that the control apparatus 91 can selectively raise the belt conveyor conveying surface 33 above the roller conveyor conveying surface in order to remove the crates 3 from the roller conveyor 131 when said crates are situated above the belt conveyor 133. It is thus possible for crates 3 to be selectively raised from the roller conveyor 131 by the belt conveyor 133 and conveyed in the conveying direction F2 to a crate stacking section.

The conveying path furthermore has a conveying path main section 141 (dash-dotted section) and multiple, in this case two, crate stacking sections 37-1, 37-2 (dash-double dotted sections), which are arranged laterally adjacent to the conveying path main section 141. Crate feed sections/crate discharge sections 35-1, 39-1 and 35-2, 39-2, associated with the respective crate stacking sections 37-1, 37-2, of the belt conveyor conveying surface 33 overlap the conveying path main section 141. That is to say, the conveying path main section 141 is simultaneously the crate feed section and the crate discharge section. The crate stacking sections 37-1, 37-2 thus receive individual crates from the roller conveyor 131 by means of the belt conveyor 133. Stacked crates are discharged from the crate stacking section 37-1, 37-2 onto the roller conveyor in the reverse sequence.

At the respective crate stacking section 37-1, 37-2 there is arranged an associated crate lifting apparatus 50. Here, the two crate stacking sections 37-1, 37-2 are arranged on mutually opposite sides of the conveying path main section 141. Such an arrangement may for example occupy a footprint which corresponds for example at least substantially to dimensions of a Euro pallet (1200×800 mm). Furthermore, the footprint may also be for example at least substantially 1400×800 mm. It is however also possible for the crate-stacking sections 37-1, 37-2 to be arranged offset with respect to one another at the conveying path main section 141, or more than two crate stacking sections may be provided. It is also possible, for example, for a further roller conveyor to be provided adjacent to the crate stacking section 37-1 and/or 37-2 (opposite the side at which the roller conveyor 131 is provided; cf. in this regard, for example, the dashed illustration in FIG. 5). Consequently, the crates 3 and/or crate stacks can be fed into (and removed from) the respective crate stacking section 37-1, 37-2 from both one and the other roller conveyor.

This arrangement of the crate conveying apparatus 30 and of the crate stacking sections 37-1, 37-2 makes it possible for different crate types to be removed from the roller conveyor 131 and stacked by means of respectively corresponding crate-stacking apparatuses. The stacked crates 3 can then be fed to the roller conveyor 131 (or to the other roller conveyor) again and transported away.

What is claimed is:

1. A crate-stacking system comprising:
a multiplicity of crates for stacking one on top of the other in a crate-stacking direction, wherein the respective crate has an upper insertion opening for the insertion of articles into the crate, and wherein the respective crate has a base which is situated opposite the upper insertion opening and which has an underside, at which underside the base is equipped, on at least two opposite sides, with a respective elongate projection which extends downward from the underside and with a lateral spacing to a respectively associated outer longitudinal edge of the base, such that, at the at least two opposite sides, a laterally outwardly open engagement longitudinal recess is provided which is delimited by the underside of the base and by the respective elongate projection and which has an engagement height extending in the crate-stacking direction, a crate-stacking apparatus for the automatic stacking of the crates, wherein the crate-stacking apparatus has:
  a crate conveying apparatus with a conveying path which defines a conveying surface and on which the crates can be transported, and which has:
    a crate feed section onto which the crates can be fed,
    a crate stacking section in which the crates can be stacked, and
    a crate discharge section from which the stacked crates can be discharged, wherein the crate conveying apparatus is designed to convey the crates from the crate feed section to the crate stacking section and to convey the stacked crates from the crate stacking section to the crate discharge section, and
  a crate lifting apparatus which is arranged at the crate stacking section and which, on opposite sides of the conveying path, has gripping elements which are movable toward one another and away from one another in a gripping direction at least substantially parallel to the conveying surface and which are movable upward and downward synchronously in the crate-stacking direction at least substantially perpendicular to the conveying direction, wherein each gripping element has a free end with a gripping finger which projects laterally toward the conveying path and which, in the crate-stacking direction, has an engagement thickness which is at least substantially equal to or smaller than the engagement height of the engagement longitudinal recess, such that a respective crate can be gripped at mutually opposite sides by virtue of the gripping fingers engaging, at the mutually opposite sides, into the associated engagement longitudinal recesses, and wherein the respective gripping element has a lateral abutment shoulder which is formed with a shoulder spacing to a free end of the associated gripping finger, wherein the shoulder spacing is smaller than a lateral engagement depth of the engagement longitudinal recess, such that, when the respective gripping finger engages into the associated engagement longitudinal recess, the abutment shoulder is in abutting contact with a side surface of the crate and the respective gripping finger is in contact with the underside of the base but not with the respective elongate projection, and
a control apparatus which is connected to a sensor that detects at least one characteristic of at least one crate, the control apparatus further being connected to the crate conveying apparatus and to the crate lifting apparatus and on the basis of the at least one sensed characteristic of the at least one crate controls the crate conveying apparatus and the crate lifting apparatus in a manner coordinated with one another such that a process can be repeatedly performed in which a crate situated in the crate stacking section on the conveying surface can be gripped and lifted by the gripping elements, in each case one new crate can be conveyed into the crate stacking section below the lifted crate, the lifted crate can be set down onto the new crate, and the in each case new crate can in turn be gripped by the gripping elements and lifted together with the one or more previous crates set down thereon in order that, in turn, a new crate can be arranged there below.

2. The crate-stacking system as claimed in claim 1, wherein, on each side of the conveying path, there is provided a single gripping element with a single gripping finger which is of elongate form in the direction of the conveying path.

3. The crate-stacking system in claim 2, wherein the movement of the gripping elements toward one another and away from one another is a pivoting movement about a spindle which is at least substantially parallel to the conveying surface.

4. The crate-stacking system as claimed in 2, wherein the movement of the gripping element on one side of the conveying path towards and away from the gripping element on the opposite side of the conveying path is not synchronous with the movement of the gripping element on the opposite side of the conveying path and is controllable by the control apparatus.

5. The crate-stacking system in claim 4, wherein the crate lifting apparatus has, at the opposite sides of the conveying path, centering elements which are movable toward one another and away from one another in a centering direction at least substantially parallel to the conveying surface, wherein each centering element has an upper and a lower centering section, which centering sections are oriented in each case laterally with respect to the conveying path in order, for the centering of the previous crate/crates with respect to a new crate, to be able to laterally make contact with a respectively associated side surface of the previous crate/crates and with a respectively associated side surface of the new crate.

6. The crate-stacking system as claimed in claim 5, wherein the centering elements are mechanically coupled in terms of motion to the gripping elements in order to mechanically synchronize the movement of the centering elements with the movement of the gripping elements.

7. The crate-stacking system as claimed in claim 2, wherein the movement of the gripping element on one side of the conveying path towards and away from the gripping element on the opposite side of the conveying path is synchronous with the movement of the gripping element on the opposite side of the conveying path and is controllable by the control apparatus.

8. The crate stacking system as claimed in claim 1, wherein the gripping elements are movable toward one another and away from one another in a substantially linear gripping direction and at least substantially parallel to the conveying surface.

9. The crate-stacking system as claimed in claim 1 wherein the sensor detects a type of the crate.

10. The crate-stacking system as claimed in claim 1 wherein the sensor detects a position of the crate.

11. The crate-stacking system as claimed in claim 1 wherein the sensor is a camera or a laser scanner.

12. A crate-stacking apparatus for the automatic stacking of crates, wherein the crate-stacking apparatus comprises:
  a crate conveying apparatus with a conveying path which defines a conveying surface and on which the crates can be transported, and which has: a crate feed section onto which the crates can be fed, a crate stacking section in which the crates can be stacked, and a crate discharge section from which the stacked crates can be discharged, wherein
    the crate conveying apparatus is designed to convey the crates from the crate feed section to the crate stacking section and to convey the stacked crates from the crate stacking section to the crate discharge section, and a crate lifting apparatus which is arranged at the crate stacking section and which, on opposite sides of the conveying path, has gripping elements which are movable toward one another and away from one another in a gripping direction at least substantially parallel to the conveying surface and which are movable upward and downward synchronously in a crate-stacking direction at least substantially perpendicular to the conveying direction, wherein each gripping element has a free end with a gripping finger which projects laterally toward the conveying path, by means of which gripping finger the crate can be gripped, and wherein the respective gripping element has a lateral abutment shoulder which is formed with a shoulder spacing to a free end of the associated gripping finger, wherein the shoulder spacing is smaller than a lateral engagement depth of an engagement longitudinal recess of the crate, such that, when the respective gripping finger engages into an associated engagement longitudinal recess, the abutment shoulder is in abutting contact with a side surface of the crate and the respective gripping finger is in contact with an underside of the base but not with a respective elongate projection of the crate, and a control apparatus which is connected to a sensor that detects at least one characteristic of at least one crate, the control apparatus further being connected to the crate conveying apparatus and to the crate lifting apparatus and on the basis of the at least one sensed characteristic of the at least one crate controls the crate conveying apparatus and the crate lifting apparatus in a manner coordinated with one another such that a process can be repeatedly performed in which a crate situated in the crate stacking section on the conveying surface can be gripped and lifted by the gripping elements, in each case one new crate can be conveyed into the crate stacking section below the lifted crate, the lifted crate can be set down onto the new crate, and the in each case new crate can in turn be gripped by the gripping elements and lifted together with the one or more previous crates set down thereon in order that, in turn, a new crate can be arranged there below.

13. The crate-stacking apparatus as claimed in claim 12, wherein the gripping elements are movable toward one another and away from one another in a substantially linear gripping direction and at least substantially parallel to the conveying surface.

14. A crate-stacking system comprising:

a multiplicity of crates for stacking one on top of the other in a crate-stacking direction, wherein the respective crate has an upper insertion opening for the insertion of articles into the crate, and wherein the respective crate has a base which is situated opposite the upper insertion opening and which has an underside, at which underside the base is equipped, on at least two opposite sides, with a respective elongate projection which extends downward from the underside and with a lateral spacing to a respectively associated outer longitudinal edge of the base, such that, at the at least two opposite sides, a laterally outwardly open engagement longitudinal recess is provided which is delimited by the underside of the base and by the respective elongate projection and which has an engagement height extending in the crate-stacking direction, a crate-stacking apparatus for the automatic stacking of the crates, wherein the crate-stacking apparatus has:

a crate conveying apparatus with a main conveying path which defines a conveying surface and on which the crates can be transported, and which has:

a crate feed section onto which the crates can be fed, and a crate discharge section from which stacked crates can be discharged, at least one lateral conveying path that is substantially perpendicular to and intersects with the main conveying path at an intersection, wherein the lateral conveying path conveys crates from the main conveying path from the intersection to at least one crate stacking section located on the lateral conveying path and transfers stacked crates from the at least one crate stacking section to the intersection, and a multiplicity of crate stacking sections where the crates are stacked and are arranged laterally adjacent to the lateral conveying path, a crate lifting apparatus which is arranged at each crate stacking section and which, on opposite sides of the lateral conveying path, has gripping elements which are movable toward one another and away from one another in a gripping direction at least substantially parallel to the lateral conveying surface and which are movable upward and downward synchronously in the crate-stacking direction at least substantially perpendicular to the lateral conveying direction, wherein each gripping element has a free end with a gripping finger which projects laterally toward the lateral conveying path and which, in the crate-stacking direction, has an engagement thickness which is at least substantially equal to or smaller than the engagement height of the engagement longitudinal recess, such that a respective crate can be gripped at mutually opposite sides by virtue of the gripping fingers engaging, at the mutually opposite sides, into the associated engagement longitudinal recesses, and wherein the respective gripping element has a lateral abutment shoulder which is formed with a shoulder spacing to a free end of the associated gripping finger, wherein the shoulder spacing is smaller than a lateral engagement depth of the engagement longitudinal recess, such that, when the respective gripping finger engages into the associated engagement longitudinal recess, the abutment shoulder is in abutting contact with a side surface of the crate and the respective gripping finger is in contact with the underside of the base but not with the respective elongate projection, and a control apparatus which is connected to a sensor that detects at least one characteristic of at least one crate, the control apparatus further being connected to the crate conveying apparatus and to the crate lifting apparatuses and on the basis of the at least one sensed characteristic of the at least one crate controls the crate conveying apparatus and the crate lifting apparatuses in a manner coordinated with one another such that a process can be repeatedly performed in which a crate situated in the crate stacking section on the lateral conveying surface can be gripped and lifted by the gripping elements, in each case one new crate can be conveyed into the crate stacking section below the lifted crate, the lifted crate can be set down onto the new crate, and in each case the new crate can in turn be gripped by the gripping elements and lifted together with the one or more previous crates set down thereon in order that, in turn, a new crate can be arranged therebelow.

15. The crate-stacking system as claimed in claim 14, wherein at least two crate stacking sections are arranged on mutually opposite sides of the main conveying path.

16. The crate stacking system as claimed in claim 14, wherein the gripping elements are movable toward one another and away from one another in a substantially linear gripping direction and at least substantially parallel to the conveying surface.

17. The crate-stacking system as claimed in claim 14 wherein the sensor detects a type of the crate.

18. The crate-stacking system as claimed in claim 14 wherein the sensor detects a position of the crate.

19. The crate-stacking system as claimed in claim 14 wherein the sensor is a camera or a laser scanner.

* * * * *